US012631262B2

(12) United States Patent
Schnittger et al.

(10) Patent No.: US 12,631,262 B2
(45) Date of Patent: May 19, 2026

(54) VENTILATION DEVICE AND BRAKE SYSTEM

(71) Applicant: KNORR-BREMSE Systeme fuer Nutzfahrzeuge GmbH, Munich (DE)

(72) Inventors: Karsten Schnittger, Munich (DE); Martin Awrath, Munich (DE)

(73) Assignee: Knorr Bremse Systeme fuer Nutzfahrzeuge Gmbh, Munich (DE)

( * ) Notice: Subject to any disclaimer, the term of this patent is extended or adjusted under 35 U.S.C. 154(b) by 8 days.

(21) Appl. No.: 18/997,561

(22) PCT Filed: Jul. 12, 2023

(86) PCT No.: PCT/EP2023/069383
§ 371 (c)(1),
(2) Date: Jan. 22, 2025

(87) PCT Pub. No.: WO2024/033003
PCT Pub. Date: Feb. 15, 2024

(65) Prior Publication Data
US 2026/0036217 A1 Feb. 5, 2026

(30) Foreign Application Priority Data
Aug. 12, 2022 (DE) .................... 10 2022 120 437.5

(51) Int. Cl.
F16K 24/04 (2006.01)
F16K 27/00 (2006.01)
B60T 13/26 (2006.01)
(52) U.S. Cl.
CPC .............. F16K 24/04 (2013.01); F16K 27/00 (2013.01); B60T 13/26 (2013.01)

(58) Field of Classification Search
CPC .......... F16K 24/04; F16K 27/00; F16K 24/00; F15B 13/0814
See application file for complete search history.

(56) References Cited

U.S. PATENT DOCUMENTS 10,001,223 B2 * 6/2018 Vincon ................. F16K 27/029
11,103,660 B2 * 8/2021 Qiu ......................... A24F 40/51
(Continued)

FOREIGN PATENT DOCUMENTS

DE 10 2004 036 820 A1 3/2005
DE 10 2013 107 743 A1 1/2015
EP 3 996 191 A1 5/2022

OTHER PUBLICATIONS

International Search Report (PCT/ISA/210) issued in PCT Application No. PCT/EP2023/069383 dated Oct. 4, 2023 with English translation (5 pages).
(Continued)

*Primary Examiner* — Michael R Reid
(74) *Attorney, Agent, or Firm* — Crowell & Moring LLP

(57) ABSTRACT

A ventilation device, in particular for use with at least one valve device or a plurality of valve units, includes at least one air chamber element, at least one outflow section, and at least one ventilation channel for forming a fluidic connection between the exterior of the ventilation device and the at least one air chamber element. The first ventilation channel has first and second openings. The first opening is oriented opposite a first impact surface, and the second opening is oriented opposite a second impact surface such that the fluidic connection between the first and second opening and the exterior of the ventilation device is formed along at least one respective section of the first and second impact surface.

15 Claims, 3 Drawing Sheets

(56)                    References Cited

U.S. PATENT DOCUMENTS

| | | |
|---|---|---|
| 12,060,898 B2 * | 8/2024 | Frait ..................... F15B 13/085 |
| 2005/0023893 A1 | 2/2005 | Sanada |
| 2016/0186879 A1 | 6/2016 | Vincon et al. |

OTHER PUBLICATIONS

German-language Written Opinion (PCT/ISA/237) issued in PCT Application No. PCT/EP2023/069383 dated Oct. 4, 2023 with English translation (7 pages).
International Preliminary Report on Patentability (PCT/IB/326 & PCT/IB/373) issued in PCT Application No. PCT/EP2023/069383 dated Feb. 27, 2025, including Written Opinion (PCT/ISA/237) (6 pages).

* cited by examiner

VENTILATION DEVICE AND BRAKE SYSTEM

BACKGROUND AND SUMMARY

The present invention relates to a ventilation device, in particular for use with at least one valve unit or a plurality of valve units, and to a brake system comprising such a ventilation device.

Trucks are usually equipped with a pneumatic brake system. Device units of such a brake system often use pneumatic valves that vent a volume flow to the outside or to an external side, and thus to the surrounding atmosphere, or have various active surfaces that must be connected to ambient pressure.

In most cases, valves vent a volume flow to the outside in one of their switching positions. Valves can have internal active surfaces that should be exposed to an ambient pressure level as constantly as possible. Such spaces, for example below a piston with a spring arranged in it, must therefore always have an open connection to the outside and are referred to as "breathing spaces".

The valves are usually arranged and aligned vertically, so that one hole per valve pointing downwards, i.e., in the direction of gravity, is ideal for ventilation.

However, these ventilation holes have little or no protection against water ingress, e.g., when cleaning with a high-pressure cleaner.

Furthermore, in the case of complex device units of a truck brake system, it is not always possible for all valves to be arranged in this form, i.e., in a vertical direction, in order to align their ventilation holes accordingly. In this case, the moisture or liquid that has penetrated cannot, or cannot completely, drain away under the force of gravity. Especially when the temperature drops below freezing, the remaining water in the valves may freeze and block them.

It is the object of the present invention to develop a ventilation device of the type mentioned at the outset in an advantageous manner, in particular in such a way that the penetration of moisture or liquids into the ventilation device can be at least substantially prevented or counteracted and the outflow of penetrated moisture or liquid can be optimized, preferably in that a fluid connection prevents or reduces direct, immediate penetration of a water jet or the like by means of deflection points, so that a ventilation function for a plurality of device units, such as valves, can be ensured. It is a further object of the present invention to provide a brake system comprising such a ventilation device.

This object is achieved in accordance with the invention by a ventilation device and by a brake system having the features of the independent claim(s). Further advantageous embodiments are specified in the dependent claims.

It is then provided that a ventilation device, in particular for use with at least one valve unit or a plurality of valve units, is provided with at least one air chamber element, at least one outflow portion and at least one first ventilation channel, for forming a fluid connection between an outside of the ventilation device and the at least one air chamber element, wherein the outflow portion provides the fluid connection between the air chamber element and the at least one first ventilation channel. The first ventilation channel has first and second openings. A first baffle surface is directed towards the first opening and a second baffle surface is directed towards the second opening, wherein the first and second baffle surfaces are spaced apart from the first and second openings in the direction of a first longitudinal axis of the first ventilation channel and each extend over at least one cross-sectional area of the first ventilation channel, in particular in each case over at least one cross-sectional area of the first and second openings, so that the fluid connection between the first and second openings to an outside of the ventilation device is formed in each case along at least one portion of the first and second baffle surface.

The invention is based on the basic idea that a ventilation system with a splash guard can be provided, in particular a common splash guard for several (horizontally stacked) valves. In particular, the ventilation device should utilize the principle of a (common) ventilation chamber/a (common) air chamber element with an outflow portion arranged (vertically) at the bottom, which opens into a ventilation channel with openings and with baffle surfaces formed/arranged above the openings.

Furthermore, at least one deflection point can be provided on the basis of the design and arrangement of the baffle surfaces, so that penetration of moisture or liquid in the direction of a first longitudinal axis of the first ventilation channel can be prevented and/or reduced. Rather, the arrangement and design of the baffle surfaces is such that, for example, a jet of water is deflected to enter the first ventilation channel. The deflection or breaking up or redirection of the water jet means that a deep penetration of moisture/liquid into the at least one air chamber element can be at least substantially prevented and/or reduced.

In addition, the design of the outflow portion at a lower end of the air chamber element and of the ventilation channel with a first and second opening makes it possible to both facilitate the outflow of moisture/liquid and to at least substantially prevent or counteract a rise of liquid along the first ventilation channel and/or along the outflow portion into the air chamber element.

The arrangement of the outflow portion at a (vertically) lower position of the air chamber element is to be understood in the sense of the present invention in particular with regard to the appropriate use and alignment of the ventilation device or a corresponding brake system. Moisture or liquid can escape or flow out of the air chamber element via the outflow portion due to gravity.

The ventilation(s), e.g., of a plurality of valves, can take place via a common air chamber element of the ventilation device, which is formed by the ventilation device. This air chamber element, as a common space, is connected at a position vertically below the valves to at least one downward or sideways facing outflow portion to allow ventilation outward/to an outside of the ventilation device.

Ventilation can be a so-called secondary bleeding, i.e., the bleeding of valves that only need to bleed a small volume flow, e.g., solenoid valves. Furthermore, bleeding can also be understood as the connection of "breathing spaces", such as spring spaces or the like, to the (atmospheric) ambient pressure.

For the purposes of the present invention, a fluid connection means in particular a connection for bleeding. Thus, a fluid connection between the air chamber element and the first/second opening of the first ventilation channel, and along at least a portion of the associated baffles, can ensure that bleeding of, for example, a plurality of valves connected to the air chamber element can be expediently performed.

The openings of the at least one first ventilation channel allow moisture/liquid that has penetrated to flow out and/or at least substantially prevent moisture/liquid from penetrating into the air chamber element, in particular by (at least to the greatest possible extent) avoiding back pressure within the at least one first ventilation channel and/or the outflow portion.

The openings can preferably be formed at opposite ends of the first ventilation channel. Alternatively, the first/second openings can be formed along the first ventilation channel.

Since the present invention makes it possible, in particular by means of the baffle surfaces and the at least two openings of the ventilation channels, to provide both a splash guard and a drainage of penetrated liquid, in particular due to the avoidance or reduction of a back pressure, the fluid connection from the air chamber element to the atmospheric outside of the ventilation device can also be appropriately ensured.

For the purposes of the present invention, an outflow portion can in particular be an outflow opening, an outflow channel and/or the like, so that a fluid connection can be provided between the air chamber element and the first ventilation channel. According to the invention, the outflow portion is arranged or formed at a lower end of the air chamber element.

A baffle surface can be understood as a specifically shaped surface as well as associated (rounded) surface transitions to neighboring surfaces. In this sense, for example, (rounded) surface transitions can also be assigned to the respective baffle surface.

Furthermore, the first and second baffle surfaces are each spaced apart from the first and second openings in the direction of a first longitudinal axis of the first ventilation channel and each extend over at least one cross-sectional area of the first ventilation channel, in particular a cross-sectional area of the first and second openings.

In particular, the baffle surfaces are provided in such a way that a fluid connection between the first and second openings to an outer side of the ventilation device is formed along at least one portion of the first and second baffle surfaces.

A fluid connection can be ensured by means of a distance between the baffle surfaces and the respective opening of the ventilation channel. Based on the design of the baffle surfaces, this fluid connection has at least one deflection point and runs past part of the baffle surface into the ventilation channel. The fluid connection does not run solely/exclusively in the direction of the (first) longitudinal axis of the (first) ventilation channel. A splash guard can thus be provided on the basis of the baffle surfaces.

Furthermore, the first ventilation channel can have a continuous or variable cross-section along its first longitudinal axis. The openings of the first ventilation channel preferably have the same cross-sections.

In order to provide a splash guard or a deflection point for the fluid connection, the baffle surfaces are at least as large as the cross-sectional area of the ventilation channel or the respective first/second opening. In this way, a linear inflow/penetration of liquid into the ventilation channel in the direction of the associated longitudinal axis alone can be avoided.

Furthermore, it may be provided that the first ventilation channel opens into a second ventilation channel along its first and second openings and the first and second baffle surfaces. Furthermore, it is contemplated that the second ventilation channels each have third and fourth openings, wherein at least one third baffle surface is formed at a distance from and over at least one cross-sectional area of the second ventilation channels, in particular a cross-sectional area of the third opening.

The third opening and the fourth opening can preferably each be formed at opposite ends of the second ventilation channel. Alternatively, the third/fourth openings can be formed along the second ventilation channel.

In particular, the splash guard can be further optimized and supplemented by arranging or forming several ventilation channels in such a way that the fluid connection between the outside of the ventilation device and the air chamber element has several deflection points, which are formed in particular by the various baffle surfaces in combination with the respectively assigned openings of the ventilation channels.

The first and second ventilation channels can be aligned or arranged offset at an angle to each other, preferably at an angle of approximately 90°, so that a deflection point is formed along the transition between the first and second ventilation channels. Furthermore, the first/second baffle can be formed as part of the second ventilation channel or separately, as additional elements in the region of the openings of the first ventilation channel.

Furthermore, it may be provided that no baffle surface is formed in the region of the fourth opening. This enables a more variable design of the ventilation channels, wherein the lack of a fourth baffle surface means that there is no, at least no significant, disadvantage in terms of preventing the ingress of moisture/liquid.

Alternatively, a fourth baffle surface in the region of the fourth opening or the fourth opening can be formed in the opposite direction.

The second ventilation channels, designed in the form of a series connection with the first ventilation channels, can prevent or reduce the ingress of moisture or liquid.

It may also be provided that the first and second baffle surfaces are larger than the cross-sectional areas of the first ventilation channel, in particular larger than the respective cross-sectional areas of the first and second openings. It is also possible that the third baffle surface is larger than the cross-sectional area of the second ventilation channel, in particular larger than the cross-sectional area of the third opening.

This prevents the ingress of moisture/liquid in the direction of the longitudinal axis of the respective ventilation channel. In particular, by extending the baffle surfaces over or beyond the cross-section of the respective opening, at least one deflection point can be created which can perform a splash guard function.

Furthermore, it is contemplated that the baffle surfaces are designed and arranged in such a way that the fluid connection between the air chamber element and an outer side of the ventilation device has several deflection points along the openings.

Preferably, at least one deflection point is provided by means of the baffle surfaces in such a way that the ingress of dirt, liquids such as water and the like can be prevented or reduced.

In particular, for example, a high-pressure water jet cannot penetrate directly into the ventilation channel, but is at least substantially deflected or split up by means of the structural arrangement and design of the ventilation channels with the baffle surfaces within the ventilation device.

It is also possible for the ventilation device to be designed in one or more parts, in particular with a first side part and a cover element or with corresponding first and second side parts and a sealing element arranged between the several parts.

Accordingly, the ventilation device can have a first side part in the form of a structured main body with, among other things, the air chamber element, as well as an unstructured cover element for closing the structures of the first side part.

Alternatively, the ventilation device can be designed with a first side part and a corresponding second side part, wherein the first and second side parts are each designed as structured side parts. The two side parts can have symmetrical structures or asymmetrical structures.

In this way, among other things, the air chamber element, the outflow portion and/or the first ventilation channel can be formed symmetrically divided into the two side parts, or divided asymmetrically, e.g., in that the air chamber element is formed at least primarily in the first side part and/or the first ventilation channel is formed at least primarily in the second side part.

With the optional sealing element between the two components of the ventilation device, i.e., between the first side part and the cover element or between the first and second side part, the air volume must be compressed when water enters the common space sealed at the top in order to reach the valves or the structures to be ventilated.

In addition to a splash guard function, in particular by means of the baffle surfaces, and a bleeding or drainage function, in particular by means of the openings of the ventilation channels, a fluid-static/dynamic resistance against the penetration of liquid into the ventilation device is thus provided.

Furthermore, it may be provided that the at least one outflow portion is formed at a lower end of the air chamber element in the vertical direction. Furthermore, it is contemplated that the at least one outflow portion is designed as at least one outflow opening or as at least one outflow opening in combination with at least one outflow channel to provide a fluid connection between the air chamber element and the at least one first ventilation channel.

Preferably, the outflow portion is arranged opposite or along the air chamber element in such a way that moisture or liquid can escape or flow away in the direction of the force of gravity.

Furthermore, the outflow portion can be designed as an outflow opening in conjunction with an outflow channel, preferably in the sense of a rising channel. Penetrating moisture or liquid, such as water, must therefore rise along the outflow portion against the force of gravity in order to reach the valves or the structures to be ventilated.

It is also contemplated that the ventilation device is designed to accommodate and bleed several valves in fluid connection with the air chamber element.

In this way, a central bleeding can be provided for several structures to be ventilated, such as valves. The bleeding infrastructure according to the invention can be easily adapted to the number of valves or structures to be ventilated by enlarging or reducing the size of the air chamber element in particular.

In this sense, the air chamber element represents a common space provided by the ventilation device, for example by the first and second side parts in combination with a sealing element arranged therebetween.

According to a further subsidiary aspect, the present invention relates to a brake system, in particular for trucks, comprising at least one ventilation device according to the invention.

All the structural and functional features associated with the ventilation device according to the invention described above and its possible embodiments can also be provided alone or in combination in the brake system according to the invention and the associated advantages can be achieved.

Further details and advantages of the invention will now be discussed in more detail on the basis of the exemplary embodiments illustrated in the drawings.

DETAILED DESCRIPTION OF THE DRAWINGS

Figure 1:
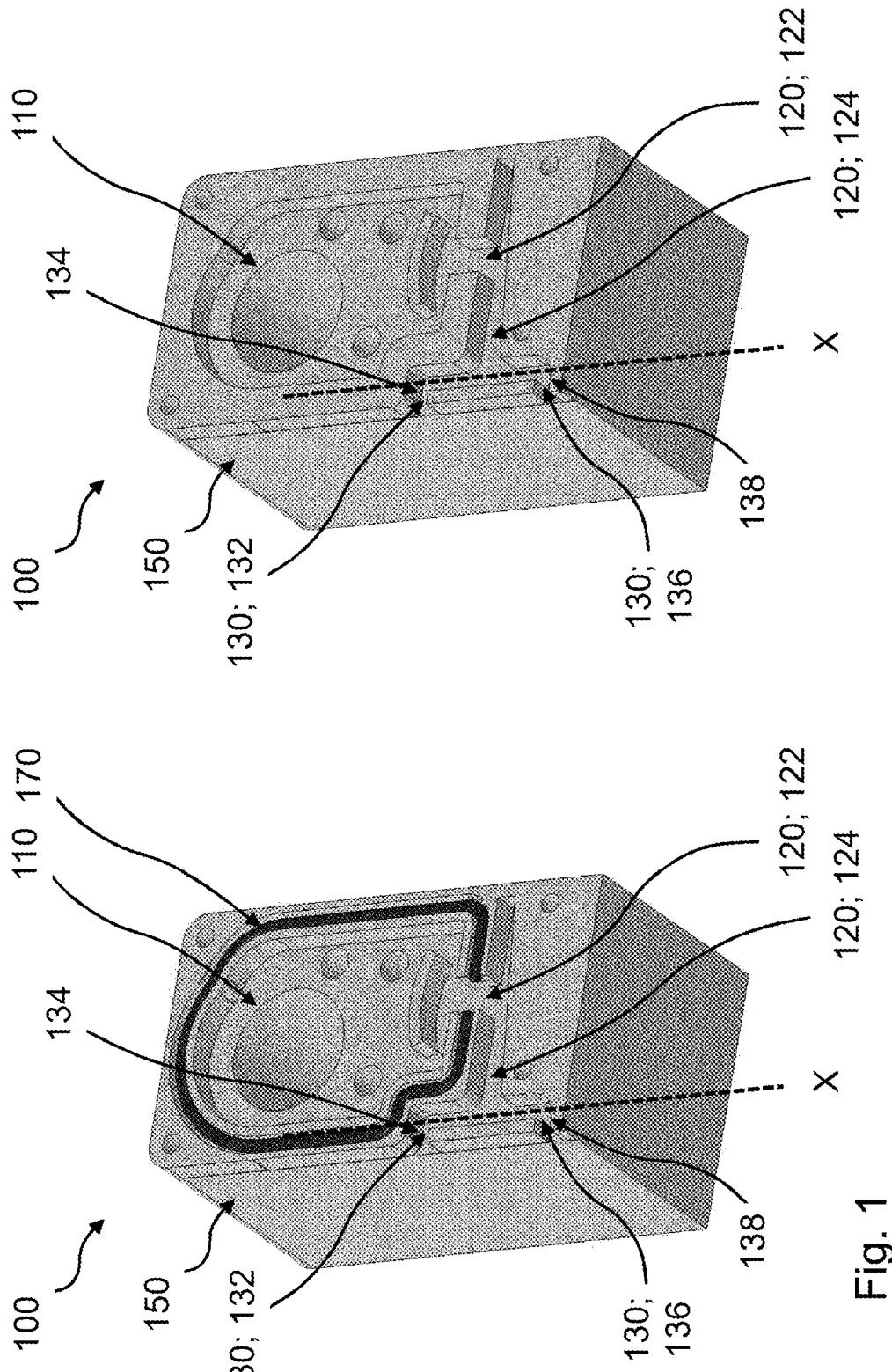
FIG. 1 is a perspective view of a first exemplary embodiment of a ventilation device.

FIG. 1 shows a perspective view of a first exemplary embodiment of a ventilation device 100.

According to the first exemplary embodiment, the ventilation device 100 is designed with a first side part 150.

The side part 150 can have a sealing element 170 (see left-hand illustration in FIG. 1) or can be designed without a sealing element 170 (see right-hand illustration in FIG. 1).

The ventilation device 100 further comprises an air chamber element 110, an outflow portion 120 and at least one first ventilation channel 130.

The air chamber element 110 can be designed in such a way that bleeding can be provided for several valves, several device units or the like. In particular, the first side part 150 can have a plurality of receptacles for valves, device units or the like in the region of the air chamber element 110.

According to FIG. 1, the outflow portion 120 can be formed with an outflow opening 122, which can merge into an outflow channel 124.

The outflow portion 120, in particular the outflow opening 122, can be formed on a lower side (in the vertical direction) of the air chamber element 110 as shown in FIG. 1.

In particular, in the context of an appropriate use, the outflow portion 120 can be formed on a vertically lower side of the air chamber element 110 in order to allow moisture/liquid to run out of the air chamber element 110 in the direction of the acting force of gravity or to counteract the penetration of moisture/liquid.

Referring to FIG. 1, the outflow channel 124 may extend in a substantially horizontal direction and provide a fluid connection via the outflow opening 122 to the air chamber element 110.

According to FIG. 1, the outflow channel 124 can have a tapered cross-section, in particular so that a drainage of moisture/liquid can be facilitated and/or a penetration of moisture/liquid can be at least substantially prevented or counteracted.

The outflow channel 124 can merge into a first ventilation channel 130.

According to FIG. 1, the ventilation channel 130 is formed with a first opening 132 and a second opening 136.

According to FIG. 1, it is provided that the first and second openings 132; 136 are formed at opposite ends of the first ventilation channel 130.

Alternatively, the first/second opening 132; 136 may be provided along the first ventilation channel.

The first/second openings 132; 136 are formed in combination with a first and second baffle surface 134; 138, respectively.

The first/second baffle 134; 138 is arranged at a distance from the first/second opening 132; 136 and extends at least over the cross-section of the first/second openings 132; 136.

In particular, the first/second baffle surfaces 134; 138 are formed and arranged at a distance from the first or second opening 132; 136 in the direction of a first longitudinal axis X of the first ventilation channel 130.

The baffle surfaces 134; 138 may be formed as a wall portion of the fluid connection within the ventilation device 100 or the side part 150, or may be provided as separate surfaces within/along the fluid connection.

At least one deflection point is formed along the fluid connection from an outer side of the ventilation device 100 and along at least a part/portion of the baffle surfaces 134; 138 via the openings 132; 136 into the ventilation channel 130.

Figure 2:
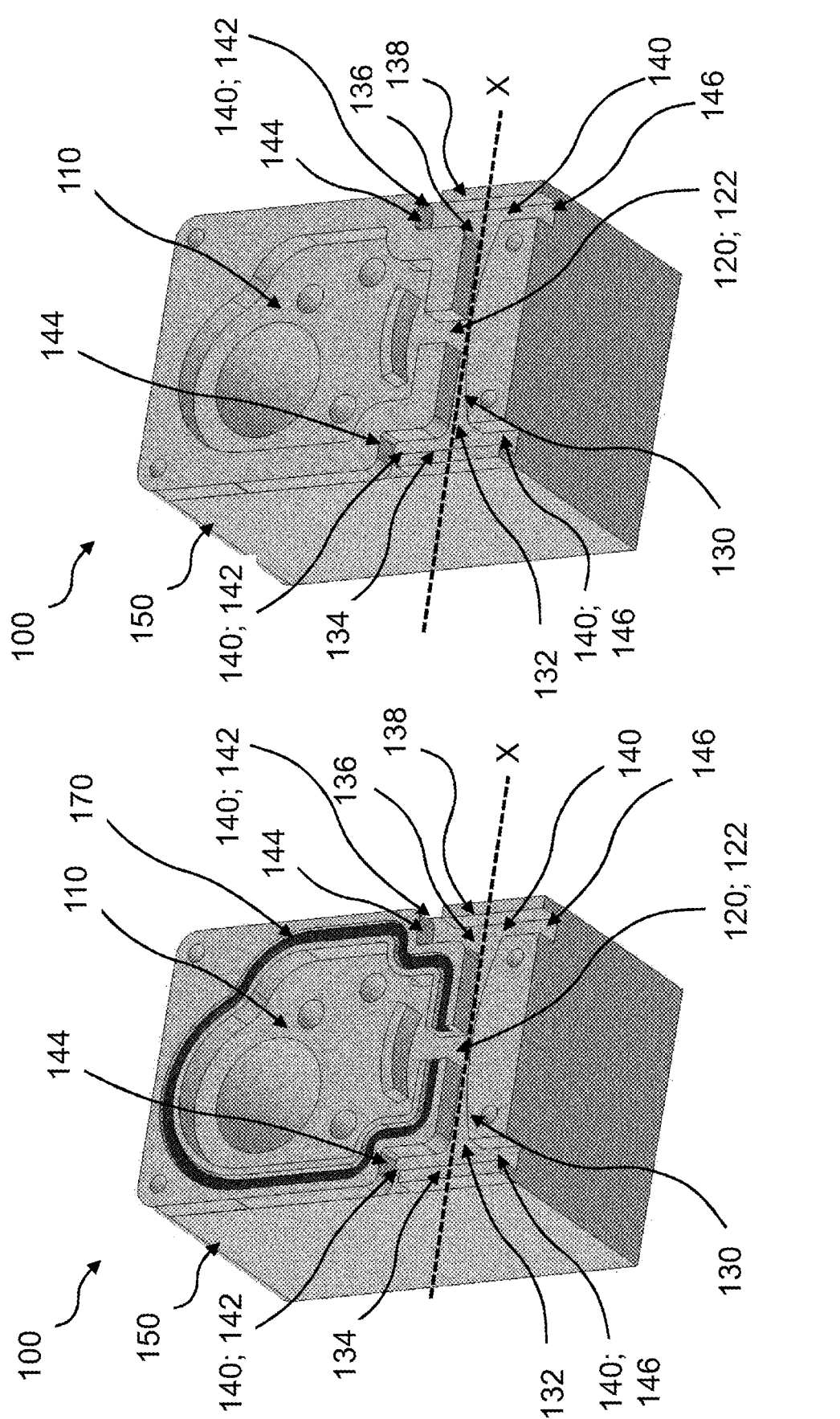
FIG. 2 is a perspective view of a second exemplary embodiment of a ventilation device.

FIG. 2 shows a perspective view of a second exemplary embodiment of a ventilation device 100.

As in the first exemplary embodiment, the second exemplary embodiment of the ventilation device 100 can also be provided as a first side part 150 with the sealing element 170 (see left-hand illustration according to FIG. 2) or without an additional sealing element 170 (see right-hand illustration according to FIG. 2).

The exemplary embodiment of the ventilation device 100 according to the invention shown in FIG. 2 has substantially the same structural and functional features as the first exemplary embodiment of the ventilation device 100 shown in FIG. 1. Only the following structural and functional differences in features shall be pointed out:

In particular, the second exemplary embodiment according to FIG. 2 has a first ventilation channel 130 and a second ventilation channel 140 compared to the first exemplary embodiment according to FIG. 1.

According to FIG. 2, the outflow portion 120 is formed with an outflow opening 122.

The outflow opening 122 is arranged on a lower side of the air chamber element 110 in the vertical direction and in the direction of action of gravity.

The first outflow channel 124 is arranged or connected to the outflow opening 120.

According to FIG. 2, the first ventilation channel 130 can run in a horizontal direction.

Furthermore, the first ventilation channel 130 can have a variable cross-section along the first longitudinal axis X.

The first ventilation channel 130 further comprises first and second openings 132; 136.

According to the exemplary embodiment in FIG. 2, the first and second openings 132; 136 are provided at opposite ends of the first ventilation channel 130.

Alternatively, the openings 132; 136 may be formed along the first ventilation channel 130.

In the region of the first/second opening 132; 136, the first/second baffle surface 134; 138 is formed, in particular at a distance from the openings 132; 134 in the direction of the first longitudinal axis X.

The first/second baffle surface 134; 138 extends at least over the cross-section of the first/second opening 132; 136 and is preferably designed to be larger than the respective cross-section of the associated first/second opening 132; 136.

According to FIG. 2, the first ventilation channel 130 merges along the first/second opening 132; 136 into a second ventilation channel 140.

The first and second ventilation channels 130; 140 are offset at an angle to one another, for example by an angle of approximately 90° according to FIG. 2.

In particular, two second ventilation channels 140 are formed symmetrically to one another in the side part 150.

The second ventilation channels 140 each have third and fourth openings 142; 146.

Furthermore, at least one third baffle surface 144 is provided, preferably at a distance in the longitudinal direction or along a further/second longitudinal axis of the second ventilation channel 140 from the third opening 142.

According to FIG. 2, the fourth opening 146 can be formed without a fourth baffle surface. Alternatively, a fourth baffle surface can be arranged in the region of the fourth opening 146.

The baffle surfaces 134; 138; 144 may each be provided as a wall portion of the fluid connection within, for example, the first side part 150, or as separately formed structures.

Furthermore, according to FIG. 1 and FIG. 2, additional baffle surfaces can be provided along the fluid connection, for example in the region of the outflow opening 120 within the air chamber unit 110.

All baffle surfaces can be formed as wall portions along the fluid connection or as separate structures, for example within the air chamber unit 110 and facing the outflow opening 122 as a convex surface.

Figure 3:
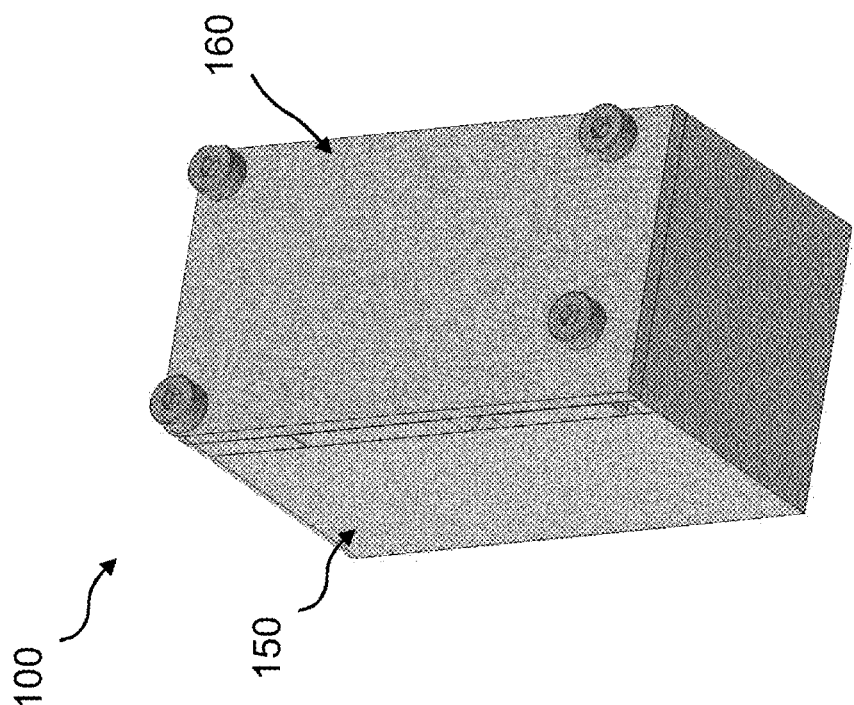
FIG. 3 is a perspective view of a third exemplary embodiment of a ventilation device according to FIGS. 1 and 2.

FIG. 3 shows a perspective view of a third exemplary embodiment of a ventilation device 100 according to FIGS. 1 and 2.

As shown in FIG. 3, the first side part 150 of the ventilation device 100 can be closed with a cover element 160. Optionally, a sealing element 170 can be arranged between the cover element 160 and the first side part 150.

Alternatively, a correspondingly designed second side part can be provided in addition to the first side part 150.

The structures of the ventilation device 100, such as the air chamber element 110 and/or the outflow portion 120 and/or the first/second ventilation channels 130; 140, can be formed symmetrically distributed along the surfaces to be arranged relative to one another in the first/second side parts, or can be formed asymmetrically distributed in the first/second side part.

Thus, it is possible that the air chamber element 110 is primarily formed in the first side part 150, wherein the first ventilation channel 130 may be primarily formed in the second side part.

In principle, the function of the ventilation device 100 can be described as follows:

By means of the outflow portion 120 arranged (vertically) at the bottom along the air chamber unit 110, penetrated moisture/liquid can be discharged from the air chamber element 110 in the direction of the gravitational force acting during use as intended.

Furthermore, the arrangement of the outflow portion 120, in particular the outflow opening 122, ensures that liquid can only enter the air chamber element 110 in a vertical direction, wherein the air volume within the air chamber element 110 is compressed.

The structural arrangement of the outflow opening 122 in particular provides protection against the entry of liquid into the air chamber element 110 and can counteract the entry.

The entry of liquid into the air chamber unit 110 can furthermore be counteracted by the formation of an outflow channel 124, in that the outflow channel 124 can be provided in the sense of a rising channel.

In the region of the openings 132; 136; 142 of the first/second ventilation channels 130; 140, the first/second/third baffle surfaces 134; 138; 144 can perform a splash guard function, in particular by providing a fluid connection between the outside of the ventilation device 100 and the air chamber element 110 at least along a deflection point.

A deflection point along the fluid connection can prevent a jet of water or the like from directly entering the ventilation device 100 in the longitudinal direction of one of the ventilation channels 130; 140.

By deflecting or splitting a water jet by means of the baffle surfaces 134; 138; 144 and the ventilation channels 130; 140, an (unhindered) penetration of moisture/liquid into the ventilation device 100 can be at least substantially prevented or counteracted.

In summary, the ventilation device 100 according to the invention can be used to provide advantageous bleeding for preferably a plurality of device units or valves to be ventilated.

In particular, a splash guard function can be provided by means of the baffle surfaces 134; 138; 144, wherein the ventilation unit 100 at least substantially prevents or counteracts the penetration of moisture/liquid, and by means of openings 132; 136; 142; 146 of the ventilation channels 130; 140, a drainage of penetrated moisture/liquid can be facilitated or promoted or supported.

Furthermore, the outflow portion 120 can be formed with an outflow opening 122, in particular in combination with an outflow channel 124, in order to counteract a rise of moisture/liquid into the (common) air chamber element 110 of the preferably plurality of device units/valves to be ventilated.

LIST OF REFERENCE SIGNS 100 ventilation device
110 air chamber element
120 outflow portion
122 outflow opening
124 outflow channel
130 first ventilation channel
132 first opening
134 first baffle surface
136 second opening
138 second baffle surface
140 second ventilation channel
142 third opening
144 third baffle surface
146 fourth opening
150 first side part
160 cover element
170 sealing element
X first longitudinal axis

The invention claimed is:

1. A ventilation device for use with at least one valve unit or a plurality of valve units, comprising:
at least one air chamber element;
at least one outflow portion; and
at least one first ventilation channel for forming a fluid connection between an outer side of the ventilation device and the at least one air chamber element,
wherein the outflow portion provides the fluid connection between the air chamber element and the at least one first ventilation channel,
wherein the first ventilation channel has first and second openings,
wherein the first opening is directed opposite a first baffle surface and the second opening is directed opposite a second baffle surface,
wherein the first and second baffle surfaces are each spaced apart from the first and second openings in a direction of a first longitudinal axis of the first ventilation channel and each extend over at least one cross-sectional area of the first ventilation channel so that the fluid connection between the first and second openings to an outside of the ventilation device is formed along at least one portion of the first and second baffle surfaces.

2. The ventilation device as claimed in claim 1, wherein the first and second baffle surfaces each extend over at least one cross-sectional area of the first and second openings.

3. The ventilation device as claimed in claim 1, wherein the first ventilation channel opens along its first and second openings and the first and second baffle surfaces into a second ventilation channel in each case.

4. The ventilation device as claimed in claim 3, wherein the second ventilation channels each have third and fourth openings,
at least one third baffle surface is formed at a distance from and over at least one cross-sectional area of the second ventilation channels.

5. The ventilation device as claimed in claim 4, wherein the at least one cross-sectional area is a cross-sectional area of the third opening.

6. The ventilation device as claimed in claim 1, wherein the first and second baffle surfaces are larger than the cross-sectional area of the first ventilation channel.

7. The ventilation device as claimed in claim 6, wherein the first and second baffle surfaces are larger than the respective cross-sectional areas of the first and second openings.

8. The ventilation device as claimed in claim 4, wherein the third baffle surface is larger than the cross-sectional area of the second ventilation channel.

9. The ventilation device as claimed in claim 8, wherein the third baffle surface is larger than the cross-sectional area of the third opening.

10. The ventilation device as claimed in claim 4, wherein the baffle surfaces are designed and arranged such that the fluid connection between the air chamber element and an outer side of the ventilation device has at least one deflection point along the openings.

11. The ventilation device as claimed in claim 1, wherein the ventilation device is designed in one or more parts with a first side part and a cover element or with corresponding first and second side parts and a sealing element arranged between the first and second side parts.

12. The ventilation device as claimed in claim 1, wherein the at least one outflow portion is formed at a lower end of the air chamber element in a vertical direction.

13. The ventilation device as claimed in claim 1, wherein the at least one outflow portion is formed as at least one outflow opening or as at least one outflow opening in combination with at least one outflow channel, for providing a fluid connection between the air chamber element and the at least one first ventilation channel.

14. The ventilation device as claimed in claim 1, wherein the ventilation device is designed to receive and ventilate the plurality of valves in fluid connection with the air chamber element.

15. A brake system for trucks comprising at least one ventilation device as claimed in claim 1.

* * * * *